United States Patent
Alshinnawi et al.

(10) Patent No.: US 10,694,043 B2
(45) Date of Patent: Jun. 23, 2020

(54) ALLOWING ACCESS TO A DEVICE RESPONSIVE TO SECONDARY SIGNALS PREVIOUSLY ASSOCIATED WITH AUTHORIZED PRIMARY INPUT

(71) Applicant: Lenovo Enterprise Solutions (Singapore) Pte. Ltd., Singapore (SG)

(72) Inventors: Shareef F. Alshinnawi, Apex, NC (US); Gary D. Cudak, Wake Forest, NC (US); Joseph F. Herman, Raleigh, NC (US); J. Mark Weber, Wake Forest, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 522 days.

(21) Appl. No.: 15/234,183

(22) Filed: Aug. 11, 2016

(65) Prior Publication Data

US 2018/0048769 A1 Feb. 15, 2018

(51) Int. Cl.
*H04M 11/00* (2006.01)
*G07C 9/00* (2020.01)
(Continued)

(52) U.S. Cl.
CPC ....... *H04M 11/007* (2013.01); *G07C 9/00174* (2013.01); *G07C 9/00817* (2013.01);
(Continued)

(58) Field of Classification Search
CPC ... H04M 11/007; H04W 12/08; H04W 4/008; B60R 25/00; B60R 25/1001; B60R 25/102
See application file for complete search history.

(56) References Cited

U.S. PATENT DOCUMENTS 9,652,978 B2 * 5/2017 Wright ................... G08C 17/02
9,761,075 B2 * 9/2017 Yoshihara .......... G07C 9/00309
(Continued)

OTHER PUBLICATIONS

Viper, "Viper SmartStart Bluetooth Module", https://www.viper.com/smartstart/product/vsm50bt/viper-smartstart-bluet . . . Jun. 9, 2016, 4 pages.
(Continued)

*Primary Examiner* — Asghar H Bilgrami
(74) *Attorney, Agent, or Firm* — Jeffrey Streets

(57) ABSTRACT

A method is provided for controlling access to a target device. The method comprises receiving, by the target device, primary input from a user or user device, wherein the primary input matches a predetermined input stored by the target device and authorizes the user or user device to access the target device. The method further comprises storing, by the target device, one or more wireless secondary signals that are detected by the target device during a time period in which the primary input is received. Still further, the method comprises allowing access to the target device in response to receiving the primary input, and then allowing access to the target device in response to subsequently receiving at least one of the one or more wireless secondary signals matching one or more of the stored wireless secondary signals in the absence of receiving the primary input.

20 Claims, 5 Drawing Sheets

(51) Int. Cl.
*H04W 4/80* (2018.01)
*H04W 12/08* (2009.01)

(52) U.S. Cl.
CPC ............ *H04W 4/80* (2018.02); *H04W 12/08* (2013.01); *G07C 9/00309* (2013.01); *G07C 2009/00793* (2013.01); *G07C 2009/00825* (2013.01); *G07C 2009/00849* (2013.01)

(56) References Cited

U.S. PATENT DOCUMENTS

| | | | | |
|---|---|---|---|---|
| 2007/0200670 A1* | 8/2007 | McBride | ............... | B60R 25/245 340/5.72 |
| 2007/0285209 A1* | 12/2007 | Heusi | ............... | G06Q 10/02 340/5.23 |
| 2010/0136944 A1* | 6/2010 | Taylor | ............... | B60R 25/00 455/404.1 |
| 2012/0253552 A1* | 10/2012 | Skelton | ............... | B60K 28/063 701/2 |
| 2013/0097683 A1* | 4/2013 | Davis | ............... | G06F 21/88 726/7 |
| 2013/0109342 A1* | 5/2013 | Welch | ............... | B60N 2/002 455/404.2 |
| 2013/0135088 A1* | 5/2013 | Simha | ............... | B60R 25/34 340/425.5 |
| 2013/0200999 A1* | 8/2013 | Spodak | ............... | G05B 1/01 340/5.65 |
| 2014/0040621 A1* | 2/2014 | Klimke | ............... | H04W 12/04 713/171 |
| 2014/0380445 A1* | 12/2014 | Tunnell | ............... | G06F 21/00 726/7 |
| 2015/0109116 A1* | 4/2015 | Grimm | ............... | B60R 25/1001 340/426.18 |
| 2016/0127900 A1* | 5/2016 | John Archibald | .... | H04W 12/06 726/7 |
| 2016/0157049 A1* | 6/2016 | Choi | ............... | H04W 4/008 455/41.2 |

OTHER PUBLICATIONS

Authy, "Multi Multi-Factor Authentication", https://www.authy.com/blog/multi-multi-factor-authentication, Jun. 9, 2016, 3 pages.

Steve Pannifer, "Alternative Authentication—What Does it Really Provide?", Consult Hyperion, Tweed House, 12 The Mount, Guildford, GU2 4HN UK, steve.pannifer@chyp.com, Jun. 9, 2016, 12 pages.

* cited by examiner

ALLOWING ACCESS TO A DEVICE RESPONSIVE TO SECONDARY SIGNALS PREVIOUSLY ASSOCIATED WITH AUTHORIZED PRIMARY INPUT

BACKGROUND

Field of the Invention

The present invention relates to methods and systems for controlling access to a device.

Background of the Related Art

Near field communication and RFID are two examples of technology that can be used to facilitate transmission of authentication data for gaining access to a device, such as a computer or a vehicle. Such authentication mechanisms are becoming more mainstream, with many modern vehicles now automatically unlocking their doors in response to a certain detectable proximity of an approaching keyless remote. Unfortunately, the accidental loss of the keyless remote can prevent a user from gaining access to the associated device when they need it most. For example, a user that has lost their vehicle's keyless remote in a shopping mall has most likely also lost their other keys and will be unable to gain access to their vehicle to go home from the mall or timely pick up their child.

BRIEF SUMMARY

One embodiment of the present invention provides a method for controlling access to a target device. The method comprises receiving, by the target device, primary input from a user or user device, wherein the primary input matches a predetermined input stored by the target device and authorizes the user or user device to access the target device. The method further comprises storing, by the target device, one or more wireless secondary signals that are detected by the target device during a time period in which the primary input is received. Still further, the method comprises allowing access to the target device in response to receiving the primary input, and allowing access to the target device in response to subsequently receiving at least one of the one or more wireless secondary signals matching one or more of the stored wireless secondary signals in the absence of receiving the primary input.

Another embodiment of the present invention provides a computer program product for controlling access to a target device, the computer program product comprising a non-transitory computer readable storage medium having program instructions embodied therewith, where the program instructions are executable by a processor to cause the processor to perform a method. The method comprises receiving, by the target device, primary input from a user or user device, wherein the primary input matches a predetermined input stored by the target device and authorizes the user or user device to access the target device. The method further comprises storing, by the target device, one or more wireless secondary signals that are detected by the target device during a time period in which the primary input is received. Still further, the method comprises allowing access to the target device in response to receiving the primary input, and allowing access to the target device in response to subsequently receiving at least one of the one or more wireless secondary signals matching one or more of the stored wireless secondary signals in the absence of receiving the primary input.

DETAILED DESCRIPTION

Figure 1:
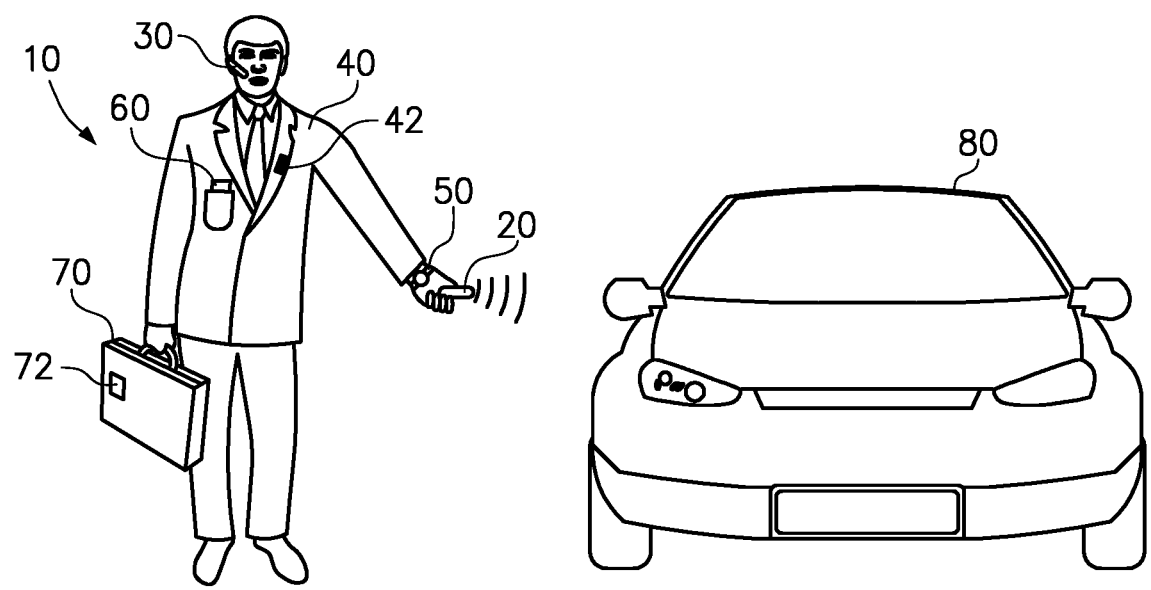
FIG. 1 is an illustration of a person locking or unlocking their vehicle.

One embodiment of the present invention provides a method for controlling access to a target device. The method comprises receiving, by the target device, primary input from a user or user device, wherein the primary input matches a predetermined input stored by the target device and authorizes the user or user device to access the target device. The method further comprises storing, by the target device, one or more wireless secondary signals that are detected by the target device during a time period in which the primary input is received. Still further, the method comprises allowing access to the target device in response to receiving the primary input, and allowing access to the target device in response to subsequently receiving at least one of the one or more wireless secondary signals matching one or more of the stored wireless secondary signals in the absence of receiving the primary input.

The target device will preferably be, or include, a computer system. For example, the target device may be a computer system, such as a remote server, desktop computer, notebook computer, tablet computer, or smartphone. Alternatively, the target device may be a device that includes a computer system, such as a modern vehicle, home automation system, building security system, television, entertainment system, appliance, or office equipment.

In certain implementations, allowing access to the target device may include allowing physical access to the target device. For example, a target device that includes an electronically actuatable lock may be physically accessed by actuating the lock to an unlocked position. In other implementations, allowing access to the target device may include allowing access to a computer system, such as the use of the hardware or software features of the computer system. Often, access to a computer system may be gained through an authentication process, such as by submitting suitable credentials like a username and password.

A user may directly provide primary input to the target device, such as by typing one or more words or codes on a keyboard or keypad attached to the target device, speaking into a microphone coupled to a system with voice-recognition capabilities, positioning themselves in front of a camera of a system with a facial-recognition system, contacting a fingerprint scanner, or using any other biometric technology. Alternatively, a user may indirectly provide primary input to the target device using a user device. Such a user device may include various technologies and have various form factors.

One popular user device is a remote transmitter unit of a remote keyless system, which is commonly provided with a new vehicle. Another type of user device is a keycard, which is typically a thin rectangular card using a barcode, magnetic stripe, RFID circuitry, or a microchip.

The primary input may take the various forms so long as the target device includes a device, such as a receiver, reader or keypad, which can receive the primary input. For example, the primary input may be in either a digital or analog format. Furthermore, the primary input may, without limitation, be transmitted in electromagnetic radiation, pressure waves, and mechanical forces. Optionally, the primary input may be manually entered into the target device by the user, or the primary input may be electronically transmitted to the target device by the user device.

Similarly, the secondary signals may vary widely, such that the target device will preferably be capable of receiving secondary signals of multiple types. For example, the target device may include one or more receivers in the form of an antennae for detecting various electromagnetic signals. In one instance, the target device will include a radio-frequency identification (RFID) tag reader, which may include a radio wave transmitter to provide energy to a passive RFID tag. While the target device may be designed to accommodate and expect a given form of primary input, such as a particular remote unit of a keyless remote system, the type of secondary signals that the target device may receive is an uncertainty. However, the target device may include one or more receivers that are designed to detect whatever types of secondary signals are available. The types of receivers will preferably be selected to reflect the types of secondary signals that are most likely to be detected. For example, at least one of the one or more wireless secondary signals may be received from a device selected from a wireless headset, a smartwatch, a mobile communication device, and combinations thereof. It should be understood that these secondary signal may be detectable as a consequence of these other devices performing their own functions and capabilities without intentionally transmitting any signal to the target device. Accordingly, the functionality of the devices that may provide such secondary signals need not be modified or even aware of the target device.

The target device is responsible for determining whether the primary input matches a predetermined input stored by the target device. Such predetermined input may be a static signal or code, or a rolling series of signals or codes. The predetermined input is preferably stored in a non-volatile data storage component of the target device, such that the target device may retrieve the predetermined input and compare it with input received by the target device. While the primary input may be in a format or media that is distinct from the secondary signals, thus making it clear when primary input has been received, it is also possible that the primary input and secondary signals are of the same signal format and type. In the latter situation, the target device may perform signal filtering in order to separately identify each signal and determine whether any of the received signals matches the predetermined input. If one of the received signals matches the predetermined input, then that matching signal is the primary input (i.e., an authentication or access event has occurred) and the other received signals are stored as secondary signals having been detected by the target device during a time period in which the primary input was received. If none of the received signals matches the predetermined input, then there is presently no primary input and the other received signals are disregarded since they are not coincident with primary input matching the predetermined input.

In one embodiment, the primary input is a wireless primary signal, wherein the wireless primary signal and the one or more wireless secondary signals are receive by one or more receiver of the target device. For example, the wireless primary signal and each of the one or more wireless secondary signals may be independently selected from radio frequency identification signals and short wavelength UHF radio signals.

In another embodiment, the step of allowing access to the target device in response to receiving the primary input includes allowing a first level of access to the target device, and the step of allowing access to the target device in response to receiving at least one of the one or more wireless secondary signals in the absence of receiving the primary input includes allowing a second level of access that is lower than the first level of access. Accordingly, the primary input is always preferred, but if the primary input cannot be provided, perhaps due to a loss of a necessary user device, then receiving the at least one of the one or more wireless secondary signals will provide the second level of access to the target device. For example, the second level of access may provide access to fewer features of the target device or access over a shorter duration than does the first level of access. Furthermore, access to the target device that is allowed in response to receiving at least one of the one or more wireless secondary signals in the absence of receiving the primary input may be limited to a number of consecutive instances of allowing access before requiring the primary input to allow a subsequent access, or limited to a maximum time period since the primary input was last received. These limitations can be implemented to prevent long term access to the target device without providing the primary input.

In a further embodiment, the method may measure a signal strength of each of the one or more wireless secondary signals that are detected by the target device, and store, for each of the one or more wireless secondary signals, the measured signal strength in association with the corresponding wireless secondary signal. Accordingly, the method may allow access to the target device in response to receiving at least one of the one or more wireless secondary signals with a signal strength within a predetermined range of the measured signal strength that is stored in association with the corresponding secondary wireless signal in the absence of receiving the primary input.

In a still further embodiment, the method stores two or more wireless secondary signals that are detected by the target device during a time period in which the primary input is received, and allows access to the target device in response to receiving a plurality of the two or more wireless secondary signals in the absence of receiving the primary input. Preferably, the target device will detect and store as many wireless secondary signals as are available. Furthermore, the number or percentage of those stored secondary signals that must be subsequently received in order to gain access to the target device without the primary input may be increased in high security applications and decreases in low security applications. In one example, the second (lower) level of access may vary as a function of the number of wireless secondary signals received in the absence of the primary input relative to the number of wireless secondary signals that were detected by the target device during a time period in which the primary input is received.

Yet another embodiment of the present invention provides a computer program product for controlling access to a target device, the computer program product comprising a non-transitory computer readable storage medium having program instructions embodied therewith, where the program instructions are executable by a processor to cause the processor to perform a method. The method comprises receiving, by the target device, primary input from a user or user device, wherein the primary input matches a predetermined input stored by the target device and authorizes the user or user device to access the target device. The method further comprises storing, by the target device, one or more wireless secondary signals that are detected by the target device during a time period in which the primary input is received. Still further, the method comprises allowing access to the target device in response to receiving the primary input, and allowing access to the target device in response to subsequently receiving at least one of the one or more wireless secondary signals matching one or more of the stored wireless secondary signals in the absence of receiving the primary input.

The foregoing computer program products may further include program instructions for implementing or initiating any one or more aspects of the methods described herein. Accordingly, a separate description of the methods will not be duplicated in the context of a computer program product.

FIG. 1 is an illustration of a person 10 locking or unlocking their vehicle 70. As shown, the person 10 is holding a remote unit (transmitter) 20 that communicates a primary input signal to a keyless entry system (not shown) of the vehicle 70. The person 10 is also using a Bluetooth™ headset 30, wearing a suit jacket 40 having an RFID tag 42 stitched into the lining, wearing a Bluetooth™ smartwatch 50, carrying a smartphone 60, and carrying a briefcase 70 with an embedded RFID tag 72. Each of the Bluetooth™ headset 30, RFID tag 42, Bluetooth™ smartwatch 50, smartphone 60, and carrying RFID tag 72 may produce secondary signals that are detectable by a receiver (now shown) associated with the vehicle 80. A more detailed discussion of how the vehicle 80 receives and processes signals or other input from the remote unit 20 and devices 30, 50, 60 and RFID tags 42, 72 is provided below in reference to FIGS. 2-3.

Figure 2:
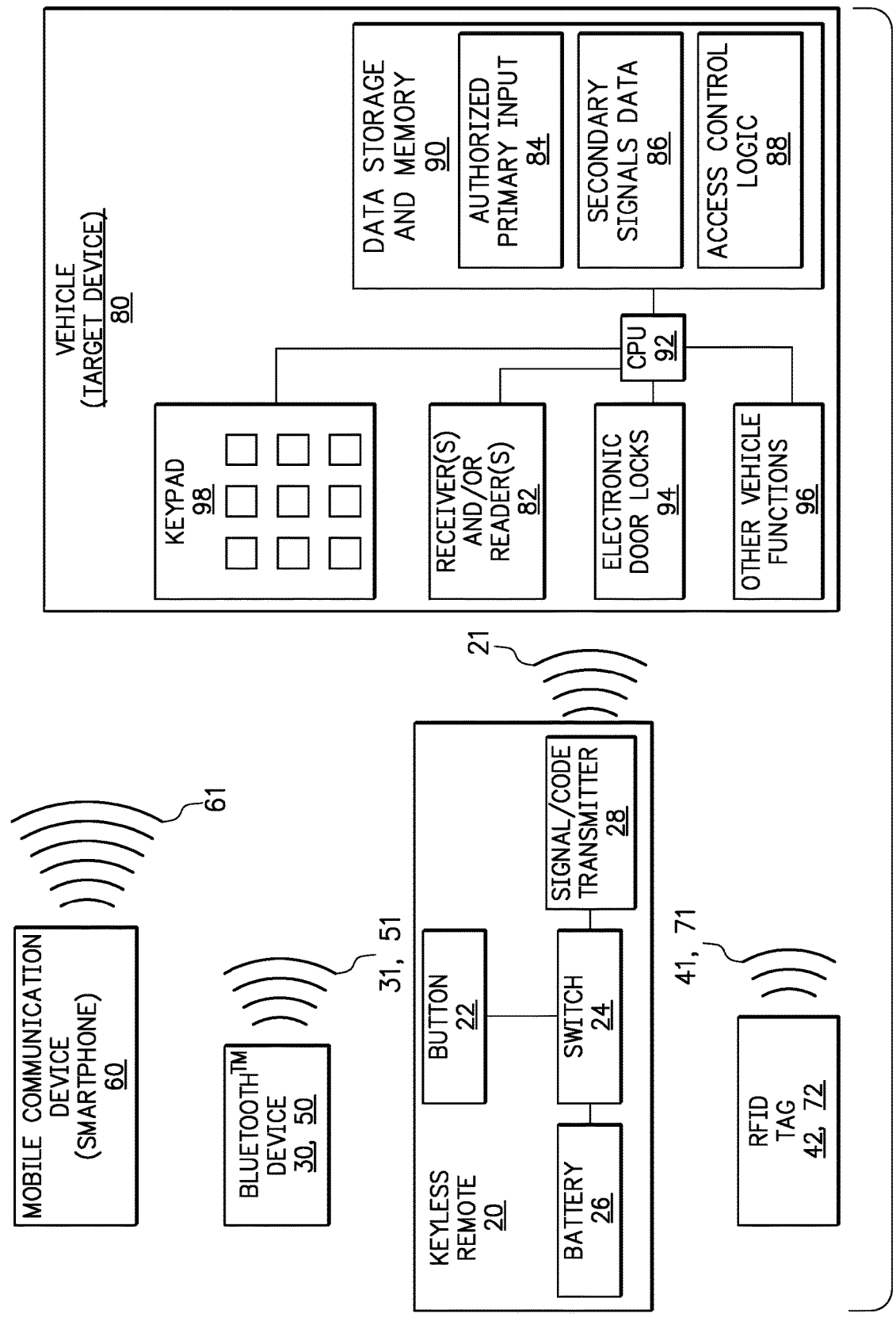
FIG. 2 is a diagram of the vehicle receiving a primary signal from a keyless remote, as well as various wireless secondary signals from other devices.

FIG. 2 is a diagram of the vehicle 80 receiving a primary signal 21 from a keyless remote 20, as well as various wireless secondary signals from other devices. For example, the vehicle 80 has one or more receivers or readers 82 that may receive separate secondary signals 31, 51 from the respective Bluetooth™ devices 30, 50, separate secondary signals 41, 71 from the respective RFID tags 42, 72, and a secondary signal 61 from the mobile communication device (smartphone) 60.

The keyless remote 20 includes a button 22 that may be manually depressed by the user to activate a switch 24 so that electrical energy is supplied from a battery 26 to a signal or code transmitter 28. Accordingly, the transmitter 28 transmits the wireless signal 21 containing identifying information, such as an encrypted code, to the vehicle 80. The receivers and/or readers 82 detect the signals 21, 31, 41, 51, 61, 71 and the processor (CPU) 92 executes the access control logic 88 to compare each signal with the authorized primary input (predetermined input) 84 stored in the data storage and memory 90. If the signal 21 matches the authorized primary input 84, then the processor 92 identifies signal 21 as the primary input and stores the other signals 31, 41, 51, 61, 71 in secondary signals data 86, since those signals were detected during the same time period that the primary input was received. Optionally, the method may store a signal strength associated with each of the secondary signals in order to better validate or differentiate each secondary signal from other signals or background noises. In addition, the access control logic 88 may cause the processor 92 to allow physical access to the vehicle 80, such as by unlocking the electronic door locks 94, or allow access to other vehicle functions 96. As an alternative to using the keyless remote 20, the user may manually enter the same or different primary input through a keypad 98 or other means for providing manual input.

Figure 3:
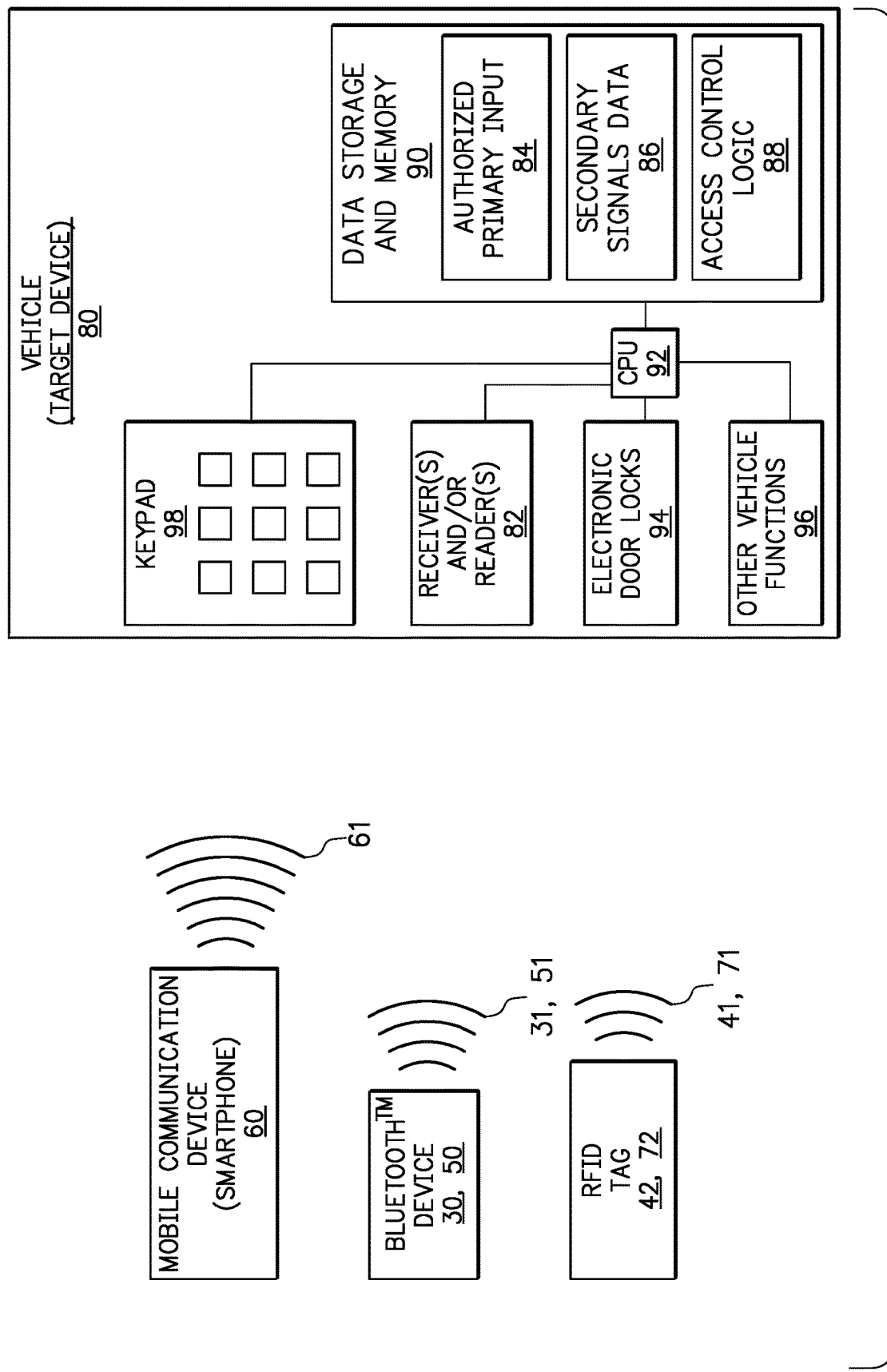
FIG. 3 is a diagram of the vehicle receiving the various wireless secondary signals from the other devices in the absence of the primary signal from the keyless remote.

FIG. 3 is a diagram of the vehicle 80 receiving the various wireless secondary signals 31, 41, 51, 61, 71 from the corresponding devices 30, 42, 50, 60, 72 in the absence of the primary signal from the keyless remote. The processor 92 executes the access control logic 88 and compares each of the detected wireless secondary signals 31, 41, 51, 61, 71 to the secondary signals or codes stored in the second signals data 86. The processor 92 may apply various criteria established by the access control logic 88 in order to determine whether or not to allow a level of access to the vehicle 80. For example, the processor 92 may unlock the electronic door locks 94 and/or enable other vehicle functions 96 in response to determining that the currently received one or more secondary signals 31, 41, 51, 61, 71 include one or more of the secondary signals stored in a secondary signals data 86.

The criteria for allowing access based on received secondary signals may specify a minimum number of received secondary signals that must match a signal stored in the secondary signal data 86, or a minimum percentage of the stored secondary signals that must be matched by one of the received secondary signals. Embodiments of the present invention are not limited to any specific criteria.

Furthermore, the specific level of access may be limited when the access is obtained using only secondary signals in the absence of the primary input. For example, access or use of the vehicle 80 may be limited to a certain mile range, limited to a certain area, or limited in movement in the direction of a certain location (such as a school, home, etc.). Optionally, a level of access to the vehicle 80 may be dependent on the level of matching between the currently received secondary signals 31, 41, 51, 61, 71 and those stored in the secondary signal data 86 (e.g. 4 out of 5 secondary signals may be currently present as compared with the secondary signals detect during a previous authentication event). In a further option, if the vehicle has not yet completed a route to an active destination of a navigation feature of the vehicle, then the vehicle may limit access to completing the route.

Example

As a specific application example, assume that Gary accesses his vehicle using his key fob (keyless remote), and his vehicle stores a first secondary signal from an RFID in Gary's clothing and a second secondary signal from the Bluetooth™ device in Gary's cell phone during the time period that the keyless remote is used to successfully access the vehicle. Gary stops at a store on his way to pick up his child. Unfortunately, Gary loses his key fob in the store. However, upon returning to the vehicle, a receiver in the vehicle detects the combination of the RFID signal (matching the stored first secondary signal) and the Bluetooth™ signal (matching the stored second secondary signal). Since the currently received first and second secondary signals match the most recently stored secondary signals, the vehicle allows Gary access to drive the car.

While much of the foregoing discussion is provided in the context of the target device being a vehicle, the present invention is not limited to accessing a vehicle. As previously stated, the target device may be, or include, a computer system. For example, the target device may be a computer system, such as a remote server, desktop computer, notebook computer, tablet computer, or smartphone, or the target device may be a device that includes a computer system, such as a modern vehicle, home automation system, building security system, television, entertainment system, appliance, or office equipment. The computer shown in FIG. 4 represent either a standalone computer or a network computer that is a target device.

Figure 4:
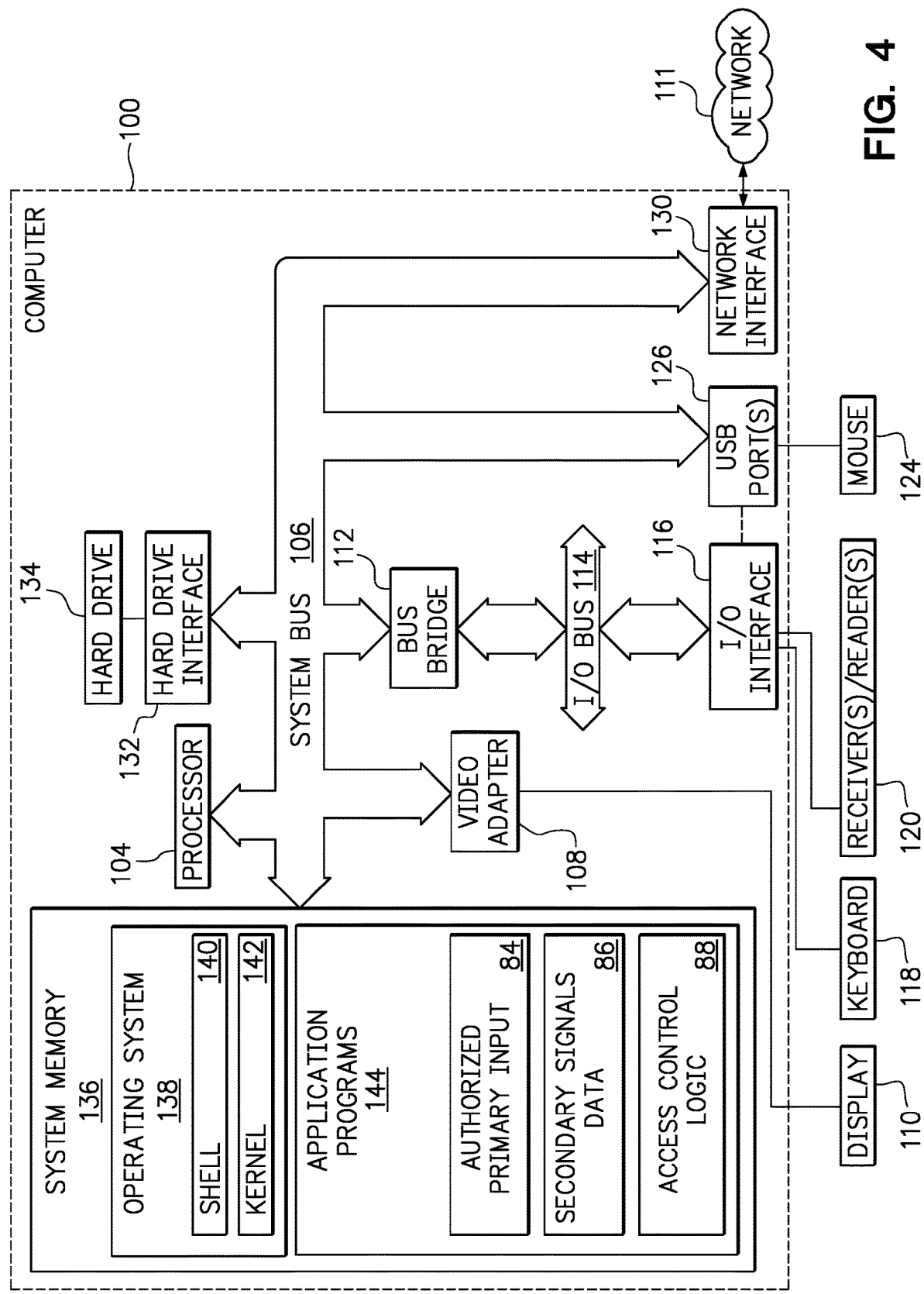
FIG. 4 is a diagram of a computer capable of implementing an embodiment of the present invention.

FIG. 4 is a diagram of a computer 100 capable of implementing embodiments of the present invention. The computer 100 includes a processor unit 104 that is coupled to a system bus 106. The processor unit 104 may utilize one or more processors, each of which has one or more processor cores. A video adapter 108, which drives/supports a display 110, is also coupled to system bus 106. The system bus 106 is coupled via a bus bridge 112 to an input/output (I/O) bus 114. An I/O interface 116 is coupled to the I/O bus 114. The I/O interface 116 affords communication with various I/O devices, including a keyboard 118, receiver(s) and/or reader(s) 120, a USB mouse 124, and USB port(s) 126. As depicted, the computer 100 is able to communicate with other network devices via the network 111 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100, including, without limitation, the authorized primary input 84, the secondary signals data 86, and the access control logic 88. The logic and data may be used to implement one or more of the embodiments disclosed herein. For example, the access control logic 88 may cause the processor 104 to control the computer system according to one or more embodiments of the present invention, such that a user may logon to the computer system generally or logon to an application program or other feature of the computer system in response to providing the necessary primary input or the computer system detecting sufficient secondary signals to meet the necessary access criteria. Optionally, one or more aspect of the access control logic may be implemented in the operating system 138, rather than the applications 144.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

Figure 5:
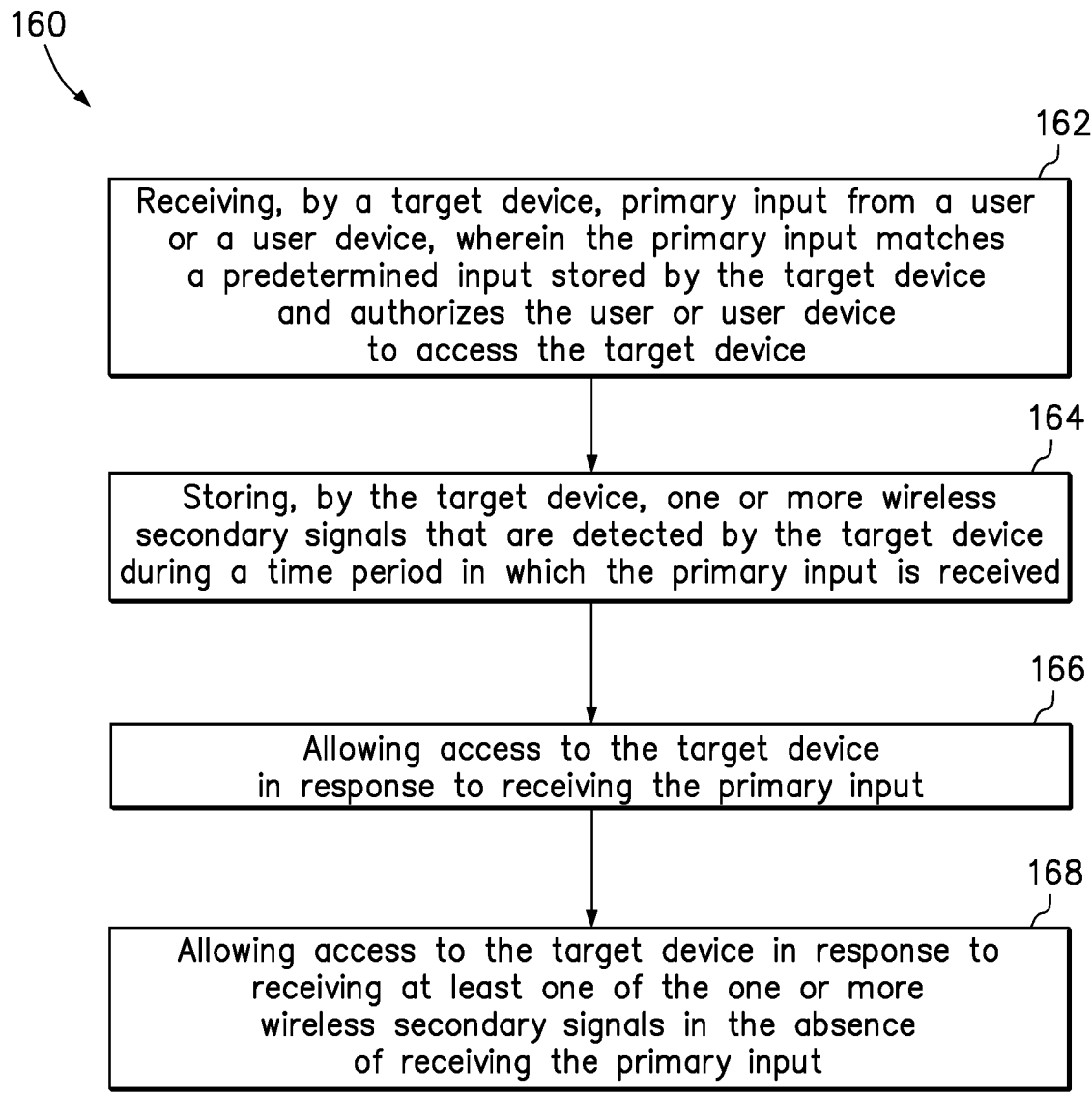
FIG. 5 is a flowchart of a method according to an embodiment of the present invention.

FIG. 5 is a flowchart of a method 160 according to one embodiment of the present invention. In step 162, the method includes receiving, by a target device, primary input from a user or user device, wherein the primary input matches a predetermined input stored by the target device and authorizes the user or user device to access the target device. In step 164, the method includes storing, by the target device, one or more wireless secondary signals that are detected by the target device during a time period in which the primary input is received. Step 166 of the method includes allowing access to the target device in response to receiving the primary input, and step 168 of the method includes allowing access to the target device in response to receiving at least one of the one or more wireless secondary signals in the absence of receiving the primary input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, by a target device, primary input from a user or user device, wherein the primary input matches a predetermined input stored by the target device and authorizes the user or user device to access the target device;
    receiving, by the target device, one or more wireless secondary signals during a time period in which the primary input is received by the target device;
    storing, by the target device, the one or more wireless secondary signals;
    allowing access to the target device in response to the target device receiving the primary input; and then
    allowing access to the target device in response to the target device receiving a wireless secondary signal that matches at least one of the one or more stored wireless secondary signals in the absence of receiving the primary input.

2. The method of claim 1, wherein allowing access to the target device in response to receiving the primary input, includes allowing a first level of access to the target device; and
    wherein allowing access to the target device in response to receiving at least one of the one or more wireless secondary signals in the absence of receiving the primary input, includes allowing a second level of access that is lower than the first level of access.

3. The method of claim 2, wherein the second level of access provides access to fewer features or a shorter duration than does the first level of access.

4. The method of claim 1, wherein allowing access to the target device includes allowing physical access to the target device.

5. The method of claim 4, wherein the target device includes an electronically actuatable lock.

6. The method of claim 1, wherein allowing access to the target device includes allowing access to a computer system.

7. The method of claim 6, wherein the computer system is selected from a remote server, desktop computer, notebook computer, tablet computer, and smartphone.

8. The method of claim 1, wherein the primary input is a wireless primary signal, and wherein the wireless primary signal and the one or more wireless secondary signals are received by one or more receiver of the target device.

9. The method of claim 8, wherein the wireless primary signal and each of the one or more wireless secondary signals are independently selected from radio frequency identification signals and short wavelength UHF radio signals.

10. The method of claim 1, wherein the primary input is manually entered into the target device by the user.

11. The method of claim 1, wherein the primary input is electronically transmitted to the target device by the user device.

12. The method of claim 11, wherein the user device is selected from a keyless entry transmitter and a keycard.

13. The method of claim 1, wherein at least one of the one or more wireless secondary signals is transmitted from a radio-frequency identification tag.

14. The method of claim 1, wherein at least one of the one or more wireless secondary signals is transmitted from a device selected from a wireless headset, a smartwatch, a mobile communication device, and combinations thereof.

15. The method of claim 1, wherein allowing access to the target device in response to receiving at least one of the one or more wireless secondary signals in the absence of receiving the primary input is limited to a number of consecutive instances of allowing access before requiring the primary input to allow a subsequent access.

16. The method of claim 1, wherein allowing access to the target device in response to receiving at least one of the one or more wireless secondary signals in the absence of receiving the primary input is limited to a maximum time period since the primary input was last received.

17. The method of claim 1, further comprising:
measuring a signal strength of each of the one or more wireless secondary signals that are detected by the target device; and
storing, for each of the one or more wireless secondary signals, the measured signal strength in association with the corresponding wireless secondary signal;
wherein allowing access to the target device in response to receiving at least one of the one or more wireless secondary signals in the absence of receiving the primary input, includes allowing access to the target device in response to receiving at least one of the one or more wireless secondary signals with a signal strength within a predetermined range of the measured signal strength that is stored in association with the corresponding secondary wireless signal in the absence of receiving the primary input.

18. The method of claim 1, wherein storing one or more wireless secondary signals that are detected by the target device during a time period in which the primary input is received, includes storing two or more wireless secondary signals that are detected by the target device during a time period in which the primary input is received; and
wherein allowing access to the target device in response to receiving at least one of the one or more wireless secondary signals in the absence of receiving the primary input, includes allowing access to the target device only in response to receiving a plurality of the two or more wireless secondary signals in the absence of receiving the primary input.

19. The method of claim 1, wherein the second level of access varies as a function of the number of wireless secondary signals received in the absence of the primary input relative to the number of wireless secondary signals that are detected by the target device during a time period in which the primary input is received.

20. A computer program product for controlling access to a target device, the computer program product comprising a non-transitory computer readable storage medium having program instructions embodied therewith, the program instructions executable by a processor to cause the processor to perform a method comprising:
receiving, by a target device, primary input from a user or user device, wherein the primary input matches a predetermined input stored by the target device and authorizes the user or user device to access the target device;
receiving, by the target device, one or more wireless secondary signals during a time period in which the primary input is received by the target device;
storing, by the target device, the one or more wireless secondary signals;
allowing access to the target device in response to the target device receiving the primary input; and then
allowing access to the target device in response to the target device receiving a wireless secondary signal that matches at least one of the one or more stored wireless secondary signals in the absence of receiving the primary input.

* * * * *